United States Patent [19]

Ashton et al.

[11] 4,216,816

[45] Aug. 12, 1980

[54] ALUMINOTHERMIC WELDING OF AUSTENITIC MANGANESE STEEL

[75] Inventors: Michael E. Ashton, Derby; Anthony J. Key, Upminster, both of England

[73] Assignees: Thermit Welding GB Limited, Essex, England; British Railways Board, London, England

[21] Appl. No.: 958,676

[22] Filed: Nov. 8, 1978

[30] Foreign Application Priority Data

Nov. 16, 1977 [GB] United Kingdom ............... 47580/77

[51] Int. Cl.$^2$ ............................................. B23K 23/00
[52] U.S. Cl. ...................................... 164/54; 164/110; 228/241; 238/164
[58] Field of Search .................. 228/241; 164/50, 334, 164/111, 54, 110; 148/38; 428/683; 238/164; 75/123 N

[56] References Cited

U.S. PATENT DOCUMENTS

| | | | |
|---|---|---|---|
| 2,855,660 | 10/1958 | DeLong et al. | 75/123 N |
| 3,010,823 | 11/1961 | Avery et al. | 75/123 N |
| 3,201,230 | 8/1965 | Mitchell et al. | 148/38 |
| 3,383,203 | 5/1968 | Baggstrom | 148/38 |
| 3,942,579 | 3/1976 | Guntermann | 238/164 |

FOREIGN PATENT DOCUMENTS 2068283 8/1971 France ................................. 75/123 N
1349810 4/1974 United Kingdom.

OTHER PUBLICATIONS

Welding Handbook, 1942 Ed. (AWS), pp. 528–530.

*Primary Examiner*—M. J. Andrews
*Attorney, Agent, or Firm*—Strimbeck & Soloway

[57] ABSTRACT

A method of aluminothermic welding of members of austenitic steel containing by weight 10 to 20% manganese, 0.5 to 1.5% carbon and 0 to 5% nickel, and particularly low carbon austenitic steels containing by weight 14 to 17% manganese, 0.5 to 1.5% carbon and 0 to 5% nickel, comprises using a particulate mix for forming the aluminothermic steel, which mix is substantially free from phosphorus and silicon and a mould whose body material is predominantly a non-silicon material.

8 Claims, No Drawings

ALUMINOTHERMIC WELDING OF AUSTENITIC MANGANESE STEEL

This invention relates to the aluminothermic welding of members of austenitic manganese steel containing by weight 10 to 20% manganese, 0.5 to 1.5% carbon and 0 to 5% nickel to each other.

Austenitic manganese steel is used for the rails of railway track, particularly at points and crossings, because of its exceptional resistance to deformation under impact loading (batter). The conventional austenitic manganese steel used widely for many years contains by weight 1.1 to 1.4% carbon and 11 to 14% manganese. This steel suffers from the disadvantage that it has a heat affected zone from about 900° C. down to about 600° C. in which carbide precipitation occurs causing brittleness. After rolling of rails made from this steel therefore the rails have to be quenched from 1000° C. to avoid slow cooling through the heat affected zone. On welding, this steel also suffers from embrittlement in the heat affected zone, particularly in processes where larger amounts of heat are generated. A post-weld heat treatment is therefore required including quenching to achieve satsifactory results which makes on-site welding difficult. It has been found that an austenitic manganese steel containing by weight 14 to 17% manganese and 0.5 to 0.95% carbon is much less susceptible to carbide formation and on slow cooling following welding displays satisfactory properties; this austenitic manganese steel will be referred to hereafter as "low carbon austenitic manganese steel".

Aluminothermic welding of the rails of railway track typically involves preheating the rail ends to be welded together, forming a mold for example from prefabricated refractory mold blocks about the rail ends, tapping molten aluminothermic steel into the cavity of the mold from a crucible positioned above the mold and allowing the molten steel to solidify so as to form a weld joining the rail ends together. Thereafter excess metal is cut away or otherwise removed by mechanical means; for example a pneumatically operated trimming chisel or a hydraulically operated trimming device may be used.

The aluminothermic steel is formed basically by reacting a particulate mix of approximately stoichiometric proportions of aluminium and iron oxide(s); other similarly acting deoxidizers, such as magnesium may be used and the terms "aluminothermic steel" and "aluminothermic welding" are intended to embrace the use of these other deoxidisers. Other particulate constituents are added to give the aluminothermic steel similar properties to the rail steel being welded and to avoid undesirable microstructures at the fusion lines.

The aluminothermic steel solidifies as long columnar grains in the case of austenitic manganese steels. Because of the concentration of low melting point eutectics at grain boundaries and the large amount of shrinkage, grain boundary weaknesses may occur. It has been found that austenitic manganese steel is particularly susceptible to such grain boundary weaknesses as a result of silicate and phosphide eutectics. Such grain boundary weaknesses may manifest themselves as intergranular solidification cracking or as hot-tears caused when the excess metal is removed by the mechanical means. Both solidification cracking and hot-tearing can lead to failure of a weld by a fatigue mechanism.

The object of the present invention is to provide an aluminothermic welding process for austenitic manganese steel in which the presence of grain boundary weaknesses in the resulting weld is kept to a tolerable level or minimised.

Accordingly the aluminothermic welding process of the present invention for welding austenitic manganese steel includes the use of a particulate mix for forming the aluminothermic steel which mix is substantially free from phosphorus and silicon and the use of a mold whose body material is predominantly a non-silicon material.

The invention is particularly applicable to the welding of low carbon austenitic manganese steel, but can also be applied to the other austenitic manganese steel referred to above providing that a subsequent heat treatment and quenching can be carried out.

In carrying the process of the invention into effect the constituents of the particulate mix for forming the aluminothermic steel are within practicality selected to have as low a phosphorus and silicon content as possible; thus traces of phosphorus and silicon may be present in the mix as unavoidable impurities.

The use of such a phosphorus and silicon free particulate mix does not in itself however completely meet the object of the invention because it was found that using conventional refractory moulds silicon was being picked up from the mold and infiltrated into the molten aluminothermic steel. This appears to be a phenomenon which does not occur to the same extent when welding ordinary (i.e. non-austenitic) rail steel by a aluminothermic process. The invention therefore further proposes the use of a mold whose body material is predominantly a non-silicon material. The preferred body material for the mold is magnesite. However other materials such as graphite may be used providing that they do not cause pick-up and infiltration of undesirable quantities of other materials, such as carbon, into the molten aluminothermic steel.

A suitable magnesite mold may be made by ramming a mixture of magnesite sand and silicate binder against a pattern. The mold is then hardened by means of reaction of the silicate with carbon dioxide to form carbonate bonds. The mold is not therefore entirely silicon free. Preferably its silicon content does not exceed 5% by weight but up to about 10% by weight of silicon may be tolerated. The important requirement is that the aluminothermic steel when present in the mold in molten form does not have a silicon content exceeding 0.6% by weight and preferably not exceeding 0.4% by weight.

The aluminothermic steel when present in the mold in molten form for welding low carbon austenitic manganese steel having by weight a manganese content of 14 to 17% and a carbon content of 0.7 to 0.8% preferably has a composition in the following range.

|  | % by weight. |
| --- | --- |
| Carbon | 0.75 to 0.95 |
| Manganese | 12 to 17 |
| Aluminium | 0.2 to 0.6 |
| Silicon | 0.6 maximum |
| Sulphur | alap (as low as possible) |
| Phosphorous | alap (as low as possible) |
| Nickel (optional) | up to 4% |
| Iron | balance. |

Within this compositional range a preferred composition is:

|  | % by weight. |
|---|---|
| Carbon | 0.8% |
| Manganese | 15% |
| Aluminium | 0.3% |
| Silicon | } alap. |
| Sulfur |  |
| Phosphorus |  |
| Nickel | 4% |
| Iron | Balance. |

Thus the particulate mix for producing the preferred composition of aluminothermic steel will typically contain the following ingredients.
1. Iron Oxide(s) (e.g. FeO and $Fe_2O_3$).
2. Aluminium Powder.
3. Mild Steel Particles (optional).
4. Ferromanganese and/or electrolytic manganese
5. Nickel shot and/or nikel alloys and/or nickel oxide (or other reducible compound of nickel)
6. Carbon (generally included as an impurity in one or more of 1. to 5.).

In welding other austenitic manganese steels the carbon, manganese and iron contents of the aluminothermic steel may be varied from the above preferred compositional range to correspond substantially to the amounts of these constitutents in the austenitic manganese steel being welded.

For producing a weld, a short preheat duration is desirable together with a fairly narrow welding gap so that weld metal shrinkage and thus the risk of cracking is reduced. Short preheat times may be tolerated without lack-of-fusion defects because of the low thermal conductivity of austenitic manganese steel as compared with conventional non-austenitic rail steels.

Either the conventional (SmW) aluminothermic welding technique or the more recently introduced (SkV) technique may be used. The SkV technique is described in British Patent No. 1,349,810.

We claim:
1. In a method of aluminothermic welding of members of austenitic maganese steel to each other, said method comprising preheating the ends of the members to be welded together, forming a refractory mold about said member ends, tapping molten aluminothermic steel into the cavity of said mold and allowing said molten steel to solidify thereby forming a weld joining said members to each other, the improvement which comprises: using (1) austenitic manganese steel which consists essentially of, by weight, 10 to 20% manganese, 0.5 to 1.5% carbon, and 0 to 5% nickel, the balance iron, (2) a particulate mix for forming the aluminothermic steel which mix is substantially free from phosphorus and silicon, and (3) a mold whose body material is predominantly a non-silicon material.

2. In a method according to claim 1, the improvement wherein said austenitic manganese steel consists essentially of, by weight, 14 to 17% manganese, 0.5 to 0.95% carbon, and 0 to 5% nickel, the balance iron.

3. In a method according to claim 1, the improvement wherein the body material of said mold is magnesite.

4. In a method according to claim 3, the improvement wherein the magnesite of said body material is bound together by carbonate bonds.

5. In a method according to claim 1, the improvement wherein said aluminothermic steel when present in the mold in molten form does not have a silicon content exceeding 0.6% by weight.

6. In a method according to claim 5, the improvement wherein said silicon content does not exceed 0.4% by weight.

7. In a method according to claim 5, the improvement wherein said austenitic manganese steel consists essentially of, by weight, 14 to 17% manganese, and 0.7 to 0.8% carbon, the balance iron, and said molten aluminothermic steel consists essentially of:

|  | % by weight |
|---|---|
| Carbon | 0.75 to 0.95 |
| Manganese | 12 to 17 |
| Aluminum | 0.2 to 0.6 |
| Silicon | 0.6 maximum |
| Sulphur | } as low as possible |
| Phosphorus |  |
| Nickel (optional) | up to 4% |
| Iron | balance |

8. In a method according to claim 6, the improvement wherein said austenitic manganese steel consists essentially of, by weight, 14 to 17% manganese, and 0.7 to 0.8% carbon, the balance iron, and said molten aluminothermic steel consists essentially of:

|  | % by weight |
|---|---|
| Carbon | 0.8% |
| Manganese | 15% |
| Aluminum | 0.3% |
| Silicon | } as low as possible |
| Sulphur |  |
| Phosphorus |  |
| Nickel | 4% |
| Iron | balance |

* * * * *